Jan. 17, 1928. J. L. SCHERMERHORN Re. 16,854

TRANSFORMER

Original Filed Nov. 6, 1925

INVENTOR
JOHN L. SCHERMERHORN
BY
A. P. T. Libby
ATTORNEY

Reissued Jan. 17, 1928.

Re. 16,854

UNITED STATES PATENT OFFICE.

JOHN L. SCHERMERHORN, OF NEWARK, NEW JERSEY, ASSIGNOR TO AMERICAN TRANSFORMER COMPANY, OF NEWARK, NEW JERSEY.

TRANSFORMER.

Original No. 1,612,947, dated January 4, 1927, Serial No. 67,392, filed November 6, 1925. Application for reissue filed November 19, 1927. Serial No. 234,540.

This invention relates to an electrical transformer and as shown and described herein is particularly adapted for use in connection with radio circuits. The general object of my invention is to improve the details entering into the construction of a transformer, whereby the general efficiency is improved and the cost of construction reduced.

Another object of my invention is to provide improved means for making connections to the windings of the transformer.

The invention will be readily understood by reference to the attached drawing, taken in connection with this specification.

In the drawing Figure 1 is a perspective view of the complete transformer.

Figure 5 is an end view of the windings of the transformer, while

Referring now to the details wherein like numbers refer to corresponding parts in the various views: The transformer comprises; a primary winding 1, and a pair of secondaries 2 and 3 preferably wound in two coils and suitably connected. The opening 4, is to receive the central part of the core laminations which are preferably E shaped, but are not shown and described herein except to say that the laminations are built up around the windings in the usual way, such as disclosed in Schermerhorn et al. Patent 1,579,955, issued April 6, 1926, and then the casing assembled around the completed unit.

Figure 1:
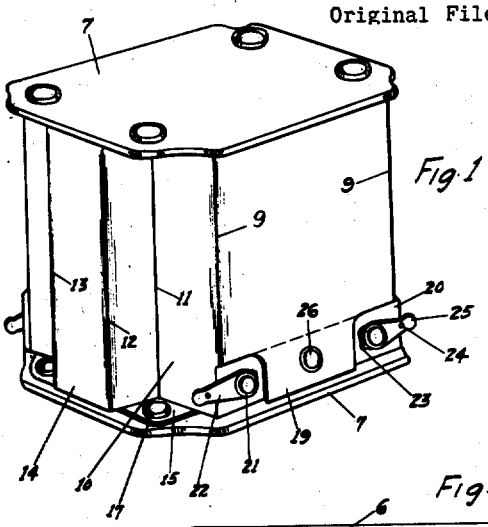

The casing consists of two similar combined side and end pieces 6, and similar top and bottom pieces 7. Piece 6, is made of one piece of suitable metal, the side portion being included between the dotted lines 8 and 9 on which lines the piece 6 is bent to form the end portions 10. The end portion 10, is formed or bent on the lines 11, 12 and 13, to form a channel shaped part 14, which is adapted to engage and securely hold the ends of the core laminations, lugs 15 are provided on opposite sides of the end portions 10, which are bent out at right angles to the channel as shown in Figure 1, each lug 15 is provided with a hole 16, and through these holes are passed eyelets 17, which also go through the top and bottom pieces 7, thereby riveting the parts of the casing together.

Figure 8:
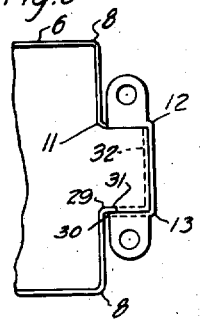
Figure 8 is a plan view of one end of the casing with the top plate and terminal board removed.

It will be understood that each of the members 6, extends half-way around the transformer and come together on line 30, the extremity of one of the pieces 6, being bent on the line 29, to lock behind the edge 30, of the other piece, as is more clearly shown in a partial plan view shown in Figure 8, it being understood that the parts are locked in reverse position on the opposite end of the transformer casing. The edge 29 may be positioned or extended to any satisfactory distance, even to the point of being over the end surface of the channel, as shown by the dotted line 32, extending from the edge 31 as illustrated in Figure 8, thereby forming a very secure lock. Each of the pieces 6 have portions cut away at 18, leaving a tongue 19. Mounted in the cut away portions or notches 18, and preferably back of the tongue 19, is a terminal connecting board or strip 20 of some good strong insulating material. Mounted on opposite ends of the terminal board 20, in any satisfactory manner, as by eyelets 21, are terminals 22, each having a finger 23, bent over and extending through connecting board 20, thereby acting as a dowel to prevent terminals 22 from shifting in their position. Furthermore the bent over ends or dowels 23, also serve as means for connecting the terminals of the transformer windings to the terminals 22, it being understood that these connections are made before the bottom plate 7, is put in position, and preferably the terminals of the primary winding being connected to the terminals on one strip and the ends of the secondary winding to the terminals on the connecting strip on the opposite side of the transformer. If desired the transformer winding ends may be reinforced and brought through the eyelets 21, and the ends passed through small holes 24, in the terminals 22 and soldered thereto. The outside connections are brought to and preferably soldered to the ends 25. The terminal strip of connecting board 20, as shown in Figure 1, is fastened to the tongue 19, by means of an eyelet 26, going through the hole 27 in the tongue. The connecting strip may be securely anchored in position without the use of the eyelet 26, by means of the arrangements shown in Figures 3, 4, and 7.

Figure 4:
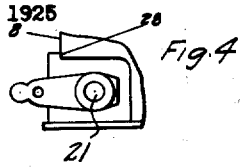
Figure 4 is a view similar to Figure 3, but of a further modified form.
Figure 3:
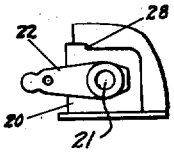
Figure 3 is a fragmentary view of a modified form showing a method of locking the terminal connecting rack in position.
Figure 2:
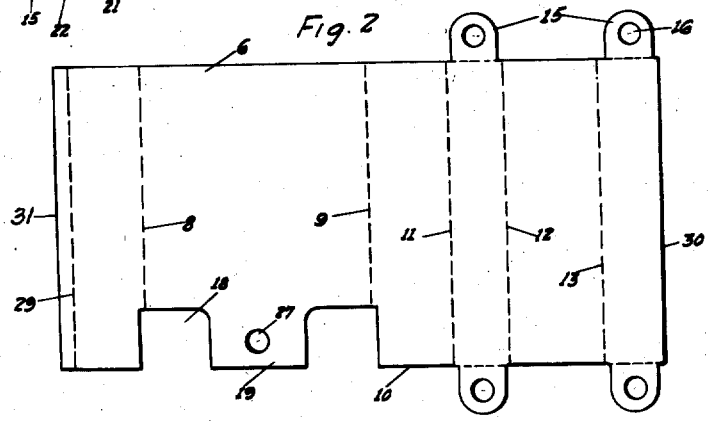
Figure 2 is a view of the combined side and end piece of the transformer case, in extended position.
Figure 5:
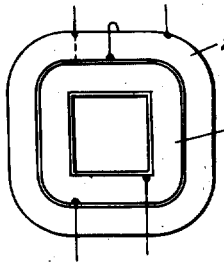
Figure 6:
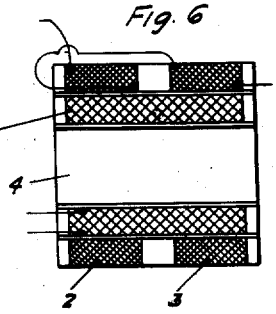
Figure 6 is a longitudinal section through the winding without the core.

In Figure 3, a notch 28 is provided in the insulating strip 20, and adapted to engage a corresponding notch in the cover piece 6. As shown in Figure 4, the notch 28 may be positioned beyond the line 8 of the cover.

Figure 7:
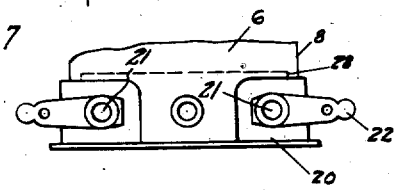
Figure 7 shows a further modified form for holding the connecting rack in place.

In Figure 7, the connecting strip is notched at both ends to fit behind the cover.

In addition to the means shown and described for holding the terminal board 20 to the combined side and end piece 6, it is obvious that other equivalent means may be employed; but in all cases it is preferable that the terminal board close the opening or openings in piece 6, so as to substantially seal the casing.

The eyelets 17, are further used for mounting the transformer which can be set on either one of the pieces 7, so that the connecting board 20, is held at the bottom of the transformer or at the top.

Other modifications in details may be made without departing from the spirit of the invention or the scope of the appended claims.

Having thus described my invention, what I claim is:

1. A transformer comprising a core, windings on the core and a casing completely enclosing the core and windings, said casing consisting of two similar top and bottom pieces, and two similar combined side and end pieces, means for fastening all of said pieces together, said side pieces having portions removed beginning at the line where the sides are formed into the ends and extending toward the center of the side and a terminal connecting board positioned in the openings produced by said removed portions and means cooperating between the terminal board and the side piece for holding the terminal board in place.

2. A transformer comprising a core, windings or the core and a casing completely enclosing the core and windings, said casing consisting of two similar top and bottom pieces and two similar combined side and end pieces, means for fastening all of said pieces together, said side pieces having portions cut out on one edge forming a tongue, said cut away portions extending from the tongue to a line on which the side piece is formed into an end and a terminal connecting board positioned in the cut out portion of the sides and behind said tongue and means cooperating between the terminal board and the side piece for holding the terminal board in place.

3. A transformer comprising a core, windings on the core and a casing completely enclosing the core and windings, said casing consisting of two similar top and bottom pieces, and two similar combined side and end pieces, means for fastening all of said pieces together, said side pieces having portions cut out on one edge forming a tongue, said cut out portions extending from the tongue to a line on which the side piece is formed into an end and a terminal connecting board positioned in the cut out portion of the sides and behind said tongue and extending slightly beyond said line on which the side piece is bent and means for fastening the terminal board to said tongue.

4. A transformer comprising, a core, windings on the core and a casing completely enclosing the core and windings, said casing consisting of two similar top and bottom pieces, and two similar combined side and end pieces, means for fastening all of said pieces together, said side pieces having portions cut out on one edge forming a tongue, said cut out portions extending from the tongue to a line on which the side piece is formed into an end and a terminal connecting board positioned in the cut out portion of the sides and behind said tongue, said terminal board having a terminal mounted on each end with means for preventing the terminals from swinging into contact with the casing and means cooperating between the terminal board and the side piece for holding the terminal board in place.

5. A transformer comprising a core, windings on the core and a casing completely enclosing the core and windings, said casing consisting of two similar top and bottom pieces and two similar combined side and end pieces, means for fastening all of said pieces together, said side pieces having portions cut out on one edge forming a tongue, said cut out portions extending from the tongue to a line on which the side piece is formed into an end and a terminal connecting board positioned in the cut out portion of the sides and behind said tongue, terminals fastened to each end of the connecting board by means of eyelets and a dowel, said eyelets serving if desired as passages for connecting leads from the terminal to the transformer windings and means cooperating between the terminal board and the side piece for holding the terminal board in place.

6. A transformer comprising a core, windings on the core and a casing completely enclosing the core and windings, said casing consisting of two similar top and bottom pieces and two similar combined side and end pieces, said side pieces having portions cut out on one edge forming a tongue, said side pieces being formed into ends on a line near the extremity away from the tongue of a cut away portion, said ends having portions formed in the shape of a channel and having lugs on both sides and opposite ends of the channel, means cooperating between said lugs and the top and bottom pieces for fastening them to the combined side and end pieces, a terminal connecting board positioned in said cut out portions and means cooperating between the terminal board and the side piece for holding the terminal board in place.

7. A transformer comprising a core, windings on the core and a casing completely enclosing the core and windings, said casing consisting of two similar top and bottom pieces and two similar combined side and end pieces, said side pieces having portions cut out on one edge forming a tongue, said side pieces being formed into ends on a line near the extremity away from the tongue, of a cut out portion, said ends having portions formed in the shape of a channel and having lugs on both sides and opposite ends of the channel, eyelets passing through the lugs and the top and bottom plates for fastening said casing parts together, said eyelets serving as mounting means for the transformer, a terminal connecting board having terminals fastened thereto positioned in said cut out portions and means passing through the tongue and connecting board for holding the latter in place.

8. A transformer comprising a core, windings on the core and a casing completely enclosing the core and windings, said casing consisting of two similar top and bottom pieces and two similar combined side and end pieces, said side pieces having portions cut out on one edge forming a tongue, said side pieces being formed into ends on a line near the extremity away from the tongue, of a cut out portion, said ends having portions formed in the shape of a channel and having lugs on both sides and opposite ends of the channel, said channels engaging the core laminations to hold them in place, rivet means passing through the lugs and the top and bottom plates for fastening said casing parts together, a terminal connecting board having terminals secured thereto positioned in said cut out portions and means cooperating between the terminal board and the side piece for holding the terminal board in place.

9. A transformer comprising a core, windings on the core and a casing completely enclosing the core and windings, said casing consisting of two similar top and bottom pieces and two similar combined side and end pieces, means for fastening all of said pieces together, said side pieces having portions removed to form a tongue, a terminal connecting board positioned across the openings formed by said removed portions and substantially closing said openings, means cooperating between the terminal board and the tongue for holding the terminal board in place, and terminals mounted on each end of the terminal board.

10. A transformer comprising a core, windings on the core and a casing completely enclosing the core and windings, said casing consisting of two similar top and bottom pieces and two similar combined side and end pieces, means for fastening all of said pieces together, each of said side pieces having at least a portion removed, a terminal connecting board positioned across the opening formed by said removed portion and substantially closing the same, means cooperating between the side piece and the terminal board for holding the latter in place, and terminals associated with the terminal board.

11. A transformer comprising a core, windings on the core and a casing completely enclosing the core and windings, said casing consisting of two similar top and bottom pieces and two similar combined side and end pieces, means for fastening all of said pieces together, each of said side pieces having at least a portion removed, a terminal connecting board carried by said combination side pieces and extending across the opening formed by said removed portion and terminals associated with the terminal board.

12. A transformer comprising a core, windings on the core, and a casing completely enclosing the core and windings, said casing consisting of top, bottom and two combined side and end pieces, said two combination pieces at least being similar, means for fastening all of said pieces together, each of said side pieces having at least a portion removed, at least one terminal connecting board carried by at least one of said side pieces and extending across the opening formed by said removed portion and terminals mounted on the terminal board.

13. A transformer comprising a core, windings on the core, and a casing completely enclosing the core and windings, said casing consisting of top, bottom and two combined side and end pieces, said two combination pieces at least being similar, means for fastening all of said pieces together, at least one terminal connecting board carried by at least one of said combination pieces and terminals associated with the terminal board.

14. A transformer comprising a core, windings on the core and a casing completely enclosing the core and windings, said casing consisting of two similar top and bottom pieces and two similar combined side and end pieces, means for fastening all of said pieces together, at least one terminal connecting board carried by at least one of said combination pieces and terminals associated with the terminal board.

In testimony whereof, I affix my signature.

JOHN L. SCHERMERHORN.